United States Patent [19]

Miida

[11] Patent Number: 5,068,738
[45] Date of Patent: Nov. 26, 1991

[54] PHASE-DIFFERENCE DETECTOR USING AN ANALOG ARITHMETIC CORRELATION DEVICE

[75] Inventor: Takashi Miida, Kanagawa, Japan

[73] Assignee: Fuji Photo Film Co., Ltd., Kanagawa, Japan

[21] Appl. No.: 321,851

[22] Filed: Mar. 10, 1989

[30] Foreign Application Priority Data

Mar. 10, 1988 [JP] Japan .................. 63-54786

[51] Int. Cl.$^5$ .............................................. G01J 1/20
[52] U.S. Cl. .................................... 358/227; 354/408; 250/201.8
[58] Field of Search ................... 354/408; 250/201 PF, 250/201.8; 358/227

[56] References Cited

U.S. PATENT DOCUMENTS

| | | | |
|---|---|---|---|
| 4,178,098 | 12/1979 | Asano et al. | 250/201 PF |
| 4,432,622 | 2/1984 | Kawashima et al. | 354/408 |
| 4,602,153 | 7/1986 | Suzuki | 250/201 PF |
| 4,746,790 | 5/1988 | Sorimachi | 354/408 |
| 4,849,619 | 7/1989 | Miida et al. | 354/408 |

Primary Examiner—Joseph A. Orsino
Assistant Examiner—Jill Jackson

[57] ABSTRACT

A phase-difference detector for use with an auto-focus detecting apparatus of a camera, the detector is capable of performing an arithmetic correlation process for detecting a phase-difference at a high speed with high accuracy. This detector uses an analog correlation arithmetic device for carrying out an analog correlation arithmetic process which generates correlative values associated with a pair of analog electric signals outputted from a pair of optical sensors. An A/D converter converts the generated correlative values outputted from the analog correlation arithmetic device into digital signals. The correlation arithmetic operation is done by directly using the analog signals generated during a photoelectric conversion, and the correlative values obtained by this computation are converted into digital signals, thereby allowing the arithmetic process to be performed at a high speed. Also, since there is substantially no rounding error incidental to a digital correlation arithmetic process because the digital conversion takes place after the correlation process, highly accurate arithmetic results can be obtained.

2 Claims, 11 Drawing Sheets

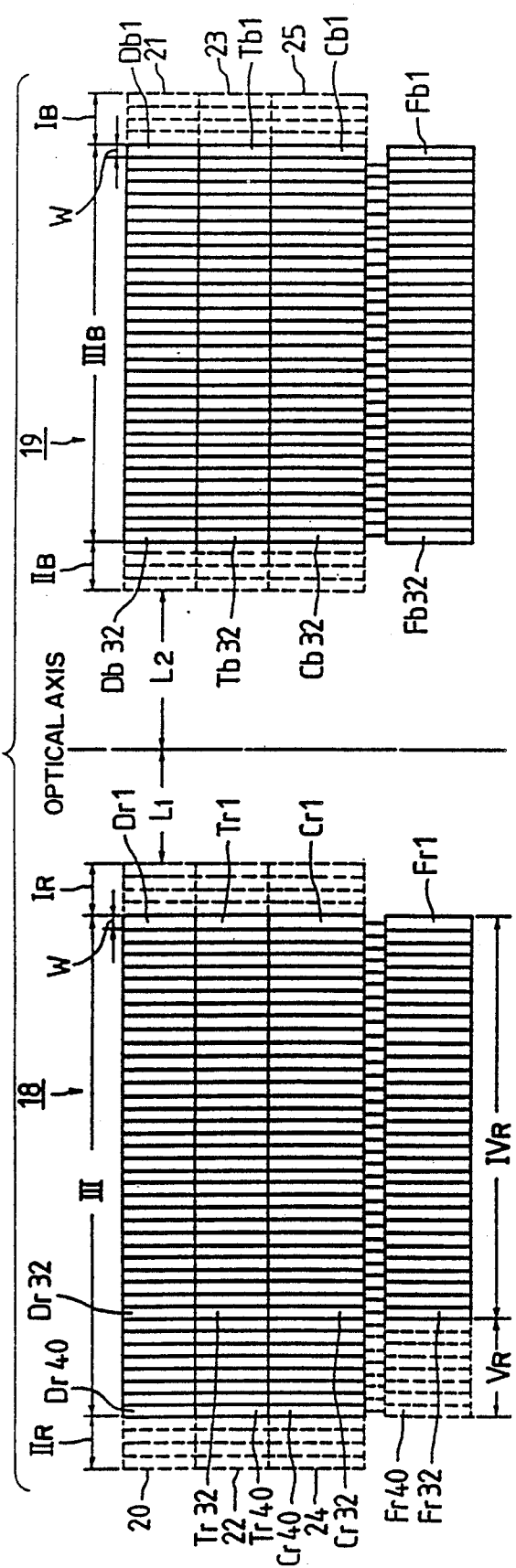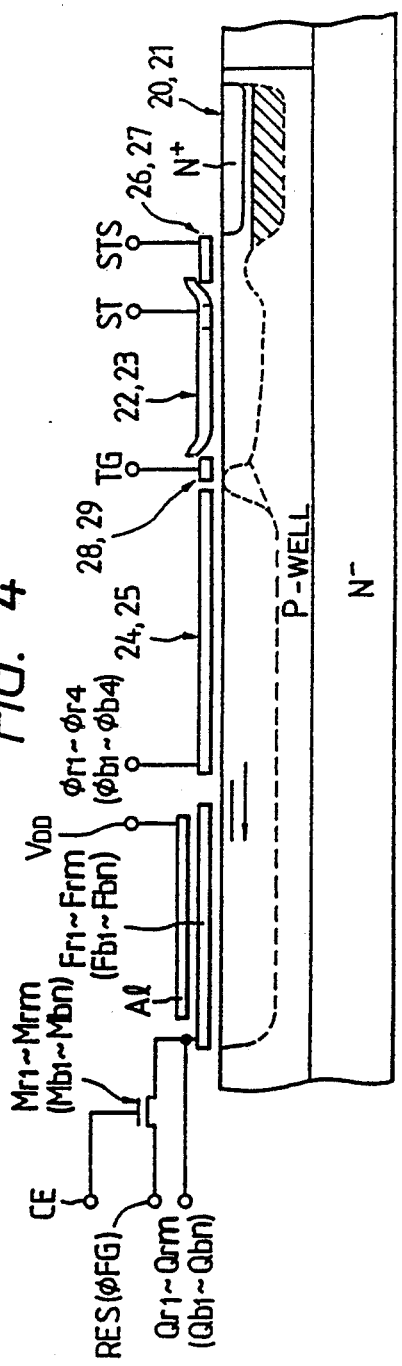

PHASE-DIFFERENCE DETECTOR USING AN ANALOG ARITHMETIC CORRELATION DEVICE

BACKGROUND OF THE INVENTION

The present invention is directed to a phase-difference detector for use with an auto-focus detecting apparatus of a camera.

FIG. 13 illustrates a typical constitution of a conventional auto-focus detecting apparatus of a camera. Description will now be given for this constitution in conjunction with FIG. 9. Disposed behind a film equivalent surface 2 provided in the rear of an imaging lens 1 are a condenser lens 3, a separator lens 4 and a phase-difference detector respectively. The phase-difference detector is composed of linear imaging devices 5 and 6 for optically receiving and photoelectrically converting a pair of images of a subject which are formed by the separator lens 4, and a processing circuit 7 for judging a focusing state on the basis of electric signals generated in respective pixels of devices 5 and 6 in accordance with a distribution of luminous intensities.

The positions of images formed on linear imaging devices 5 and 6 approach an optical axis in a front defocus state where the focused image of the subject is positioned in front of film equivalent surface 2. In a rear defocus state, the position of the focused image moves away from the optical axis. A predetermined position between the front and rear defocus states can be attained in a focusing state. Hence, processing circuit 7 functions to discriminate the focusing state by detecting the position closer to the optical axis for image-formation on the basis of the electric signals from linear imaging devices 5 and 6.

The detection of relative positions of the images formed on linear imaging devices 5 and 6 involves the use of a phase-difference detecting method. Based on this method, correlative values of a pair of images formed on linear imaging devices 5 and 6 are obtained by arithmetic operation pursuant to the following formula (1), and the focusing state is discriminated according to the amount of relative change in value (phase-difference) thereof until the correlative value reaches a minimum (or a maximum).

$$H(L) = \sum_{k=1}^{n} |B(K) - R(K - L - 1)| \quad (1)$$

where L is an integer variable of, e.g., 1 to 9, and corresponds to the amount of relative movement between the images.

The symbol $B(K)$ represents a signal outputted in time-series from each pixel of one linear imaging device 5, while $R(K-L-1)$ designates a signal outputted in time series from each pixel of the other linear imaging device 6. Correlative values $H(1), H(2), \ldots, H(9)$ are obtained by performing the arithmetic operation of the formula (1) every time the movement quality L is varied from 1 to 9. Assuming that the focusing state is present when, for instance, the correlative value $H(4)$ is the minimum, if the correlative value in such a position deviates from the minimum, the amount of deviation, i.e., a phase-difference when $L=4$, is detected as an amount of defocus.

In order to compute the correlative value $H(L)$, as illustrated in FIG. 14, A/D converters 8 and 9 are provided for converting analog signals $B(t)$ and $R(t)$ outputted from linear imaging devices 5 and 6 into digital data Bi and Ri, and also memories 10 and 11 are provided for storing digital data Bi and Ri from all the pixels. After all the data have been stored in memories 10 and 11, the data are sequentially read from memories 10 and 11 at predetermined timings. Subsequently, a digital correlation arithmetic unit 12 incorporating a microprocessor computes the correlative values pursuant to the formula (1).

The following problems are inherent in the above-mentioned conventional phase-difference detector. An A/D converter and a large capacity memory are required for performing the digital correlation arithmetic process. An expensive and high-speed A/D converter is thus needed for effecting the arithmetic operation at a high speed. The correlation arithmetic process involves a multiplicity of repetitions of multiplication and addition, and hence this leads to an increase in rounding error due to restriction in the number of quantization bits of the microprocessor or the like. The increase in rounding error in turn results in a decrease in arithmetic accuracy.

SUMMARY OF THE INVENTION

Accordingly, it is a primary object of the present invention to provide a phase-difference detector capable of performing an arithmetic correlation process for detecting a phase-difference at a high speed with high accuracy.

To accomplish this object, a phase-difference detector according to the present invention is arranged such that the correlation arithmetic operation for detecting a phase-difference is performed at a high speed by processing analog signals, and the correlative values are converted into digital data after the computation has been carried out.

In the phase-difference detector performing the above-mentioned operation according to the present invention, the arithmetic correlation process is done directly using the analog signals generated by the photoelectric conversion, and the correlative values obtained by such computation are then converted into digital signals. With this arrangement, the arithmetic process can be effected at a high speed. Besides, no rounding error is created incidental to the digital correlation arithmetic operation which is to be performed after the conversion into digital signals. Hence, arithmetic results with high accuracy can be obtained.

BRIEF DESCRIPTION OF THE DRAWINGS

FIG. 3 is a diagram of assistance in explaining a relation of array between floating gates and shift register units of the image sensor depicted in FIG. 2;

FIG. 4 is a vertical sectional view illustrating a configuration in vertical section of the principal portion of the image sensor;

FIG. 8 is a block diagram illustrating a constitution of another embodiment of the image sensor;

DESCRIPTION OF THE PREFERRED EMBODIMENTS

Figure 1:
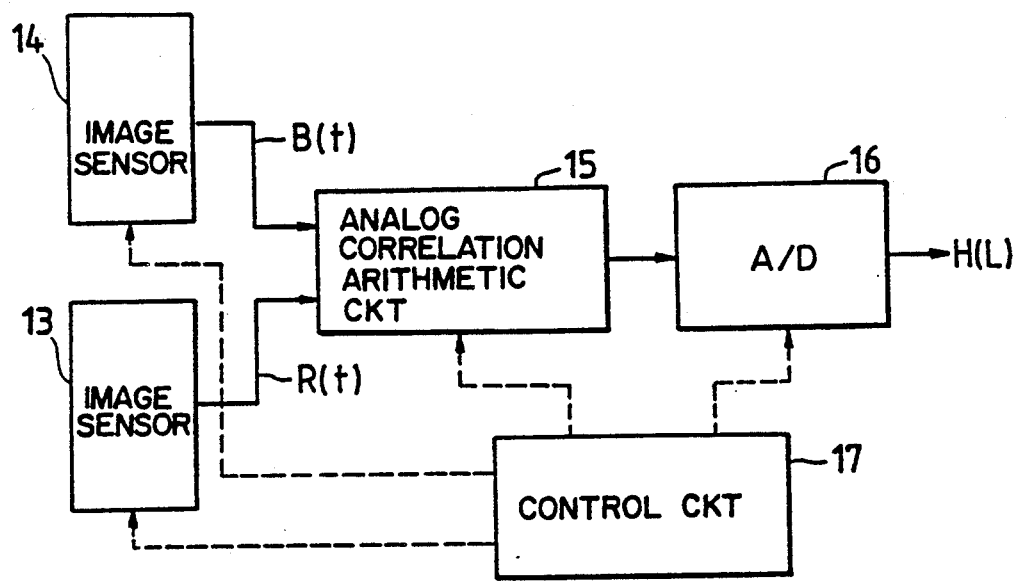
FIG. 1 is a block diagram schematically showing a constitution of one embodiment of a phase-difference detector according to the present invention.

One embodiment of a phase-difference detector according to the present invention will hereinafter be described with reference to the accompanying drawings. The description will start with the entire construction thereof in conjunction with FIG. 1. The reference numerals 13 and 14 designate image sensors; 15 denotes an analog correlation arithmetic unit for computing correlative values given by the foregoing formula (1) on the basis of analog signals R(t) and B(t) corresponding to patterns of images of a subject which are outputted from the image sensors 13 and 14; 16 denotes an A/D converter for converting the correlative values into digital data H(L), the correlative values being outputted as analog values from analog correlation arithmetic unit; and 17 represents a control signal generating unit for generating control signals at a given timing for controlling the operations of the respective circuits. The components described above are formed into one integrated circuit module on the same chip by, e.g., a C-MOS manufacturing process based on semiconductor integrated circuit technology.

Figure 2:
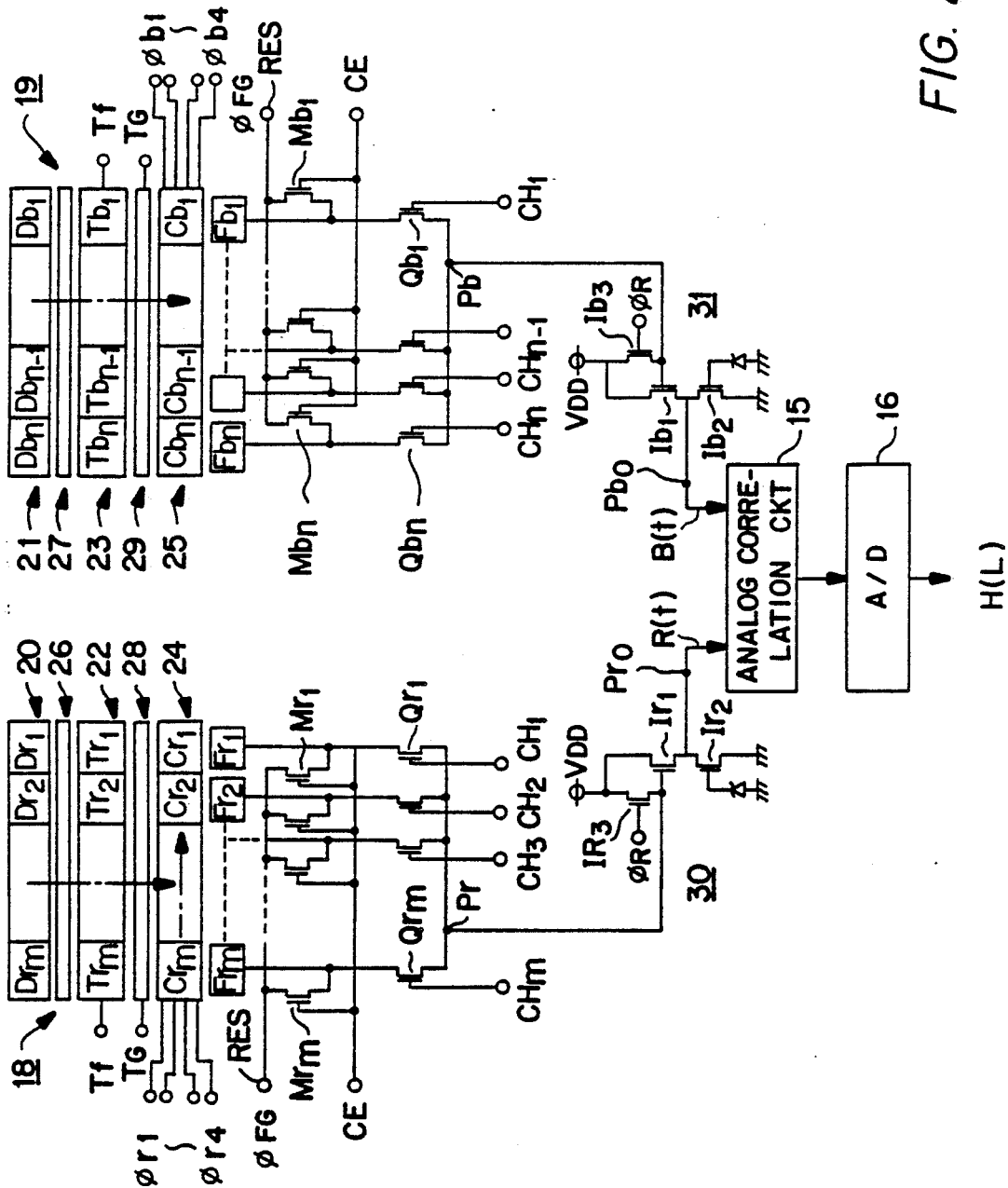
FIG. 2 is a block diagram illustrating in detail a configuration of an image sensor of FIG. 1.

Next, the respective constitutions thereof will be discussed in greater detail. To begin with, the construction of image sensors 13 and 14 will be explained with reference to FIG. 2. In FIG. 2, the numeral 18 represents a reference image sensor corresponding to image sensor 13, while 19 denotes a basic image sensor corresponding to image sensor 14. Each of reference and basic image sensors 18 and 19 has almost the same cell-constitution and is composed of: light receiving units 20 and 21 including photoelectric conversion elements Dr1 to Drm and Db1 to Dbn each serving as pixel; accumulation units 22 and 23 consisting of CCDs provided for accumulating signal charges generated in the light receiving units 20 and 21; and shift register units 24 and 25 formed of CCDs for transferring the signal charges in the horizontal direction after receiving the signal charges from accumulation units 22 and 23.

More specifically, accumulation units 22 and 23 and shift register units 24 and 25 include signal charge transfer elements Tr1 to Trm, Tb1 to Tbn, Cr1 to Crm and Cb1 to Cbn which correspond to photoelectric conversion elements Dr1 to Drm and Db1 to Dbn. Accumulation units 22 and 23 transfer the signal charges in parallel to shift register units 24 and 25, and shift register unit 24 in turn outputs the signal charges in the horizontal direction. Note that, as will be mentioned later, shift register unit 25 on the side of the basic image sensor, unlike shift register unit 24, does not transfer the signal charges in the horizontal direction.

The numerals 26 and 27 represent conductive layers formed on a surface of a channel unit for conducting the signal charge from light receiving units 20 and 21 to accumulation units 22 and 23, the conductive layers each being composed of a polysilicon layer and constituting a potential barrier having a given level.

The numerals 28 and 29 denote transfer gates for controlling the transfer of the signal charges from accumulation units 22 and 23 to shift registers 24 and 25.

Formed contiguously to respective electric charge transfer elements Cr1 to Crm and Cb1 to Cbn are floating gates Fr1 to Frm and Fb1 to Fbn which are in turn connected to a reset terminal RES through MOSFETs Mr1 to Mrm and Mb1 to Mbn, the gates of which are supplied with control signals CE. The floating gates are further connected to common contacts Pr0 and Pb0 through MOSFETs Qr1 to Qrm and Qb1 to Qbn having channel change-over signals CH1 to Chm applied to their respective gates, thereby performing a multiplexing operation. Common contacts Pr0 and Pb0 are connected via impedance conversion circuits 30 and 31 to contacts Pr and Pb, respectively.

Impedance conversion circuits 30 and 31 each having the same circuit configuration includes: MOSFETs Ir1, Ir2, Ib1 and Ib2, the drain-source paths of which are series connected between a power supply $V_{DD}$ and ground; and MOSFETs Ir3 and Ib3 connected between the gates and sources of MOSFETs Ir1 and Ib1, the arrangement being such that immediately after refresh signals ΦR have been applied thereto, common contacts Pr0 and Pb0 are clamped to power supply $V_{DD}$. The gates of MOSFETs Ir2 and Ib2 are biased at a predetermined voltage.

The positional relation between shift register units 24 and 25 and floating gates Fr1 to Frm and Fb1 to Fbn will be described in conjunction with FIG. 3.

Light receiving unit 20 of reference image sensor 18 is formed of 48 photoelectric conversion elements disposed at a pitch width W; and accumulation unit 22 and shift register unit 24 thereof are each formed of 48 electric charge transfer elements disposed at the same pitch width W. Floating gates Fr1 to Fr40 are provided contiguously to 40 electric charge transfer elements, which are combined to form a third block $III_R$, excluding first and second blocks $I_R$ and $II_R$ each consisting of 4 elements on both sides. The floating gates as a whole are sectioned into a fourth block $IV_R$ consisting of 32 elements Fr1 to Fr32 and a fifth block $V_R$ consisting of the remaining gates. One end of each floating gate Fr1 to Fr40 is connected to a reset terminal RES through respective MOSFETs Mr1, Mr2, ... Mrm which are shown in FIG. 2; and floating gates Fr1 to Fr32 are connected to contact Pr through MOSFETs Qr1 to Qrm as depicted in FIG. 2. Namely, FIG. 2 illustrates the third and fourth blocks $III_R$ and $IV_R$ of FIG. 3 as an example, the other blocks $I_R$, $II_R$, and $V_R$ being omitted. These blocks serve as preparatory regions which function when transferring the signal charges in the horizontal direction. Even when transferring the signal charges of region $III_R$ to the right hand of the Figure for the execution of correlation arithmetic operation which will be discussed later, shift register unit 24 shifts the signal charges to regions $I_R$ and $II_R$ and holds them.

On the other hand, light receiving unit 21 of basic image sensor 19 is formed of 40 photoelectric conversion elements disposed at the same pitch width W as that in reference image sensor 18; accumulation unit 23 and also shift register unit 25 thereof are each formed of 40 charge transfer elements disposed at the pitch width W. Floating gates Fb1 to Fb32 are provided contiguously to charge transfer elements Cb1 to Cb32 which are combined to constitute a third block $III_B$ exclusive of first and second blocks $I_B$ and $II_B$ each consisting of elements disposed on both sides of block $III_B$. One end of floating gates Fb1 to Fb32 are connected respectively to MOSFETs Mb1 to Mbn and Qb1 to Qbn of FIG. 2. That is, FIG. 2 illustrates the third block $III_B$ extracted from FIG. 3.

Light receiving unit 20 is spaced at a distance $L_1$ away from the optical axis, while light receiving unit 21 spaced at a distance $L_2$ away therefrom, the distance $L_2$ ($L_1+4W$) being obtained by adding 4 pitch width (4W) to distance $L_1$.

The image sensor, analog correlation arithmetic unit and A/D converter are formed on one module as a semiconductor integrated circuit device on a single chip. The configuration of this type of semiconductor integrated circuit device will be described with reference to FIG. 4. FIG. 4 is a sectional view schematically illustrating a set of components ranging from light receiving units 20 and 21 to floating gates Fr1 to Frm (Fb1 to Fbn).

Referring to FIG. 4, a plurality of N+type layers are formed on part of a P-type diffused layer (p-well) which is in turn formed on the surface of an N-type semiconductor substrate, thus constituting groups of photoelectric conversion elements of light receiving units 20 and 21.

Formed contiguously through an $SiO_2$ layer (not illustrate) on the semiconductor substrate are transfer gate electrode layers which constitute the individual charge transfer elements of signal barrier units 26, 27 and accumulation units 22 and 23, gate electrode layers which constitute transfer gates 28 and 29, and transfer gate electrode layers which constitute the individual charge transfer elements of shift register units 24 and 25. Adjacent to shift register units 24 and 25 are laminated a polysilicon layer which forms floating gates Fr1 to Frm and Fb1 to Fbn and an electrode layer Al clamped to power supply $V_{DD}$. Electrode layer Al is formed to cover the entire upper surface of the plurality of floating gates Fr1 to Frm and Fb1 to Fbn. One end of the floating gates are connected to MOSFETs Mr1 to Mrm and Mb1 to Mbn.

A reset signal $\Phi_{FG}$ applied to reset terminal RES is equalized in electric potential to power supply $V_{DD}$; and subsequently floating gates Fr1 to Frm and Fb1 to Fbn are clamped to power supply $V_{DD}$ through MOSFETs Mr1 to Mrm and Mb1 to Mbn by control signals CE each assuming "H" level. Therefore, MOSFETs Mr1 to Mrm and Mb1 to Mbn are brought into the off state, thereby forming, as indicated by a dotted line of FIG. 4, a deep potential well in the semiconductor substrate. Then, the signal charges of shift register units 24 and 25 flow into regions formed below the floating gates. Voltage variations are caused in respective floating gates Fr1 to Frm (Fb1 to Fbn) corresponding to the quantities of individual signal charges flowing into such regions, thereby detecting patterns of the images formed on light receiving units 20 and 21 as voltage signals.

On the other hand, after setting reset terminal RES at ground potential, MOSFETs Mr1 to Mrm and Mb1 to Mbn are turned ON, whereby floating gates Fr1 to Frm and Fb1 to Fbn each assume "L" level. Then the potential-well of the regions under the floating gates become shallower, with the result that the signal charges are allowed to revert to shift register units 24 and 25. Such transition of the signal charges takes place in a non-destructive manner, and hence the readout of signal charges can be repeated many times.

In this way, the signals generated through floating gates Fr1 to Frm and Fb1 to Fbn are converted into time-series signals R(t) and B(t) by the multiplex operations of MOSFETs Qr1 to Qrm and Qb1 to Qbn, and are then outputted to output contacts Pr0 and Pb0, respectively.

Figure 5:
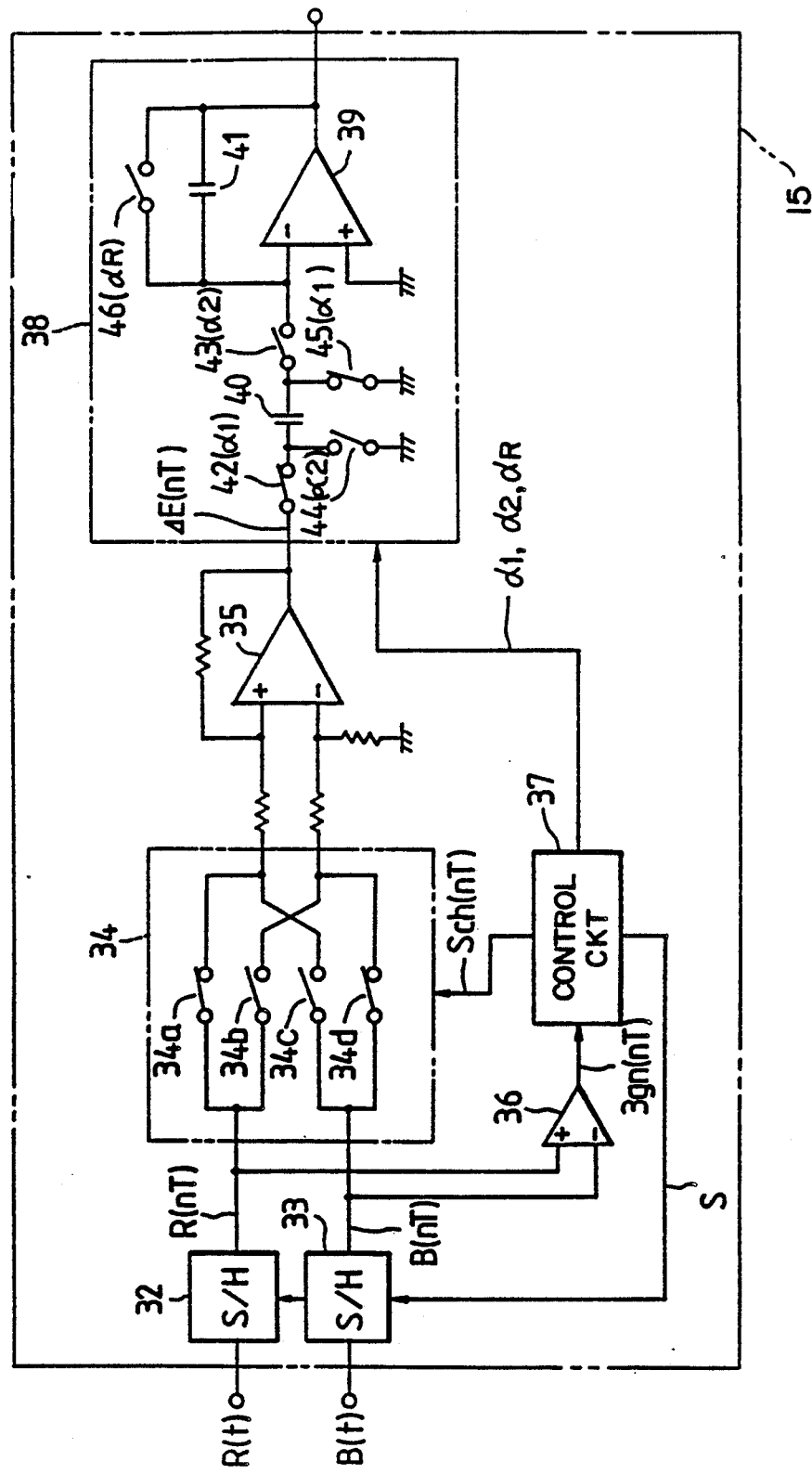
FIG. 5 is a circuit diagram showing a constitution of an analog correlation arithmetic unit.

The description will next deal with the configuration of analog correlation arithmetic unit 15 in conjunction with FIG. 5.

The numerals 32 and 33 denote sample hold circuits for sample-holding, at predetermined sampling intervals, arithmetic signals B(t) and R(t) transmitted from the image sensor. Arithmetic signals B(nT) and R(nT) obtained by sampling are outputted. Note that T represents a sampling interval, and n indicates a sampling sequence. The reference numeral 34 designates a channel change-over circuit, and 35 represents a differential amplifier. Channel change-over circuit 34 is adapted to change over the supply of signals B(nT) and R(nT) from sample hold circuits 32 and 33 to either of the input terminals of differential amplifier 35. Differential amplifier 35 outputs a difference signal $\Delta E(nT)$ which represents a difference in amplitude between the thus applied signals. More specifically, channel change-over circuit 34 includes switching elements 34a to 34d. Switching elements 34a and 34d are turned "ON", whereas switching elements 34b and 34c are turned "OFF". At this time, arithmetic signal R(nT) is supplied to a non-inversion input terminal of differential amplifier 35, while arithmetic signal B(nT) is supplied to an inversion input terminal thereof. Upon a change-over, switching elements 34a and 34d are turned "OFF", whereas switching elements 34b and 34c are turned "ON". In this case, arithmetic signal B(nT) is transmitted to the non-inversion input terminal of differential amplifier 35, while arithmetic signal R(nT) is transmitted to the inversion input terminal thereof. The above-described change-over is controlled by a control circuit 37 which will be mentioned later. A pair of switching elements 34a and 34d are turned "ON", while another pair of switching elements 34b and 34c are turned "OFF", and vice versa.

A comparator generally designated at 36 serves to compare the magnitudes of arithmetic signals R(nT) and B(nT). When $R(nT) \geq B(nT)$, comparator 36 outputs a polarity signal Sgn(nT) assuming "H" level. However, when $R(nT) < B(nT)$, the comparator outputs polarity signal Sgn(nT) assuming "L" level.

The numeral 37 denotes a control circuit adapted to output a control signal Sch(nT) for controlling the change-over of switching elements 34a through 34d in accordance with the level of polarity signal Sgn(nT). Namely, when polarity signal Sgn(nT) is at "H" level, as illustrated in the Figure, the control circuit changes over switching elements 34b and 34c to the "OFF" state. Whereas at "L" level, switching elements 34a and 34d are changed over to the "OFF" state, but switching elements 34b and 34c are changed over to the "ON" state. Based on this change-over process, the arithmetic signal having a larger amplitude is supplied invariably to the noninversion input terminal of differential amplifier 35, while the arithmetic signal having a smaller amplitude is supplied to the inversion input terminal thereof. Therefore, output ΔE(nT) from differential amplifier 35 is given as an absolute value, which is given by |B(nT)−R(nT)|, of the difference between arithmetic signals B(nT) and R(nT).

An integrator indicated at 38 comprises a differential amplifier 39, capacitor elements 40 and 41 and switching elements 42 to 46. Disposed between an output terminal of differential amplifier 35 and the inversion input terminal thereof are capacitor element 40 and switching elements 42 and 43 which are connected in series to each other. A pair of switching elements 44 and 45 are connected between both ends of capacitor element 40 and ground. A capacitor element 41 and switching element 46, which are connected to each other in parallel, are provided between the inversion input terminal of differential amplifier 39 and the output terminal thereof. Switching elements 42 and 45 are controlled so as to be turned ON or OFF by control signal $\alpha_1$ transmitted from control circuit 37. Switching elements 43 and 44 are controlled by control signal $\alpha_2$. Switching element 46 is controlled by a control signal $\alpha_R$. When control signal $\alpha_2$ assumes "L" level, switching elements 42 and 45 alone are turned "ON", whereby difference signal ΔE(nT) is stored in capacitor element 40. At the next timing, the level of control signal $\alpha_1$ is inverted to "L", while that of control signal $\alpha_2$ is inverted to "H". Immediately, switching elements 43 and 44 are turned "ON". As a result, capacitor elements 40 and 41 are coupled to each other, whereby the electric charge corresponding to difference signal ΔE(nT) accumulated in capacitor element 40 is then transferred to capacitor element 41 and accumulated therein. In the case of effecting the above-described process on plural pairs of arithmetic signals B(hT) and R(nT), as will be expressed by the following formula (2), the electric charge equivalent to an integrated value of difference signal ΔE(nT) at every sampling timing is accumulated in capacitor element 41.

$$\sum_{i=1}^{n} \Delta E(iT) = \sum_{i=1}^{n} |B(iT) - R(iT)| \quad (2)$$

Then, if the same process is executed while shifting phases θ of arithmetic signals B(iT) and R(iT) with respect to each other, the formula (3) can be established as follows:

$$H(\theta) = \sum_{i=1}^{n} |B(iT) - R(iT) + \theta| \quad (3)$$

where correlative values H(θ) can be obtained by using the analog signals.

Figure 6:
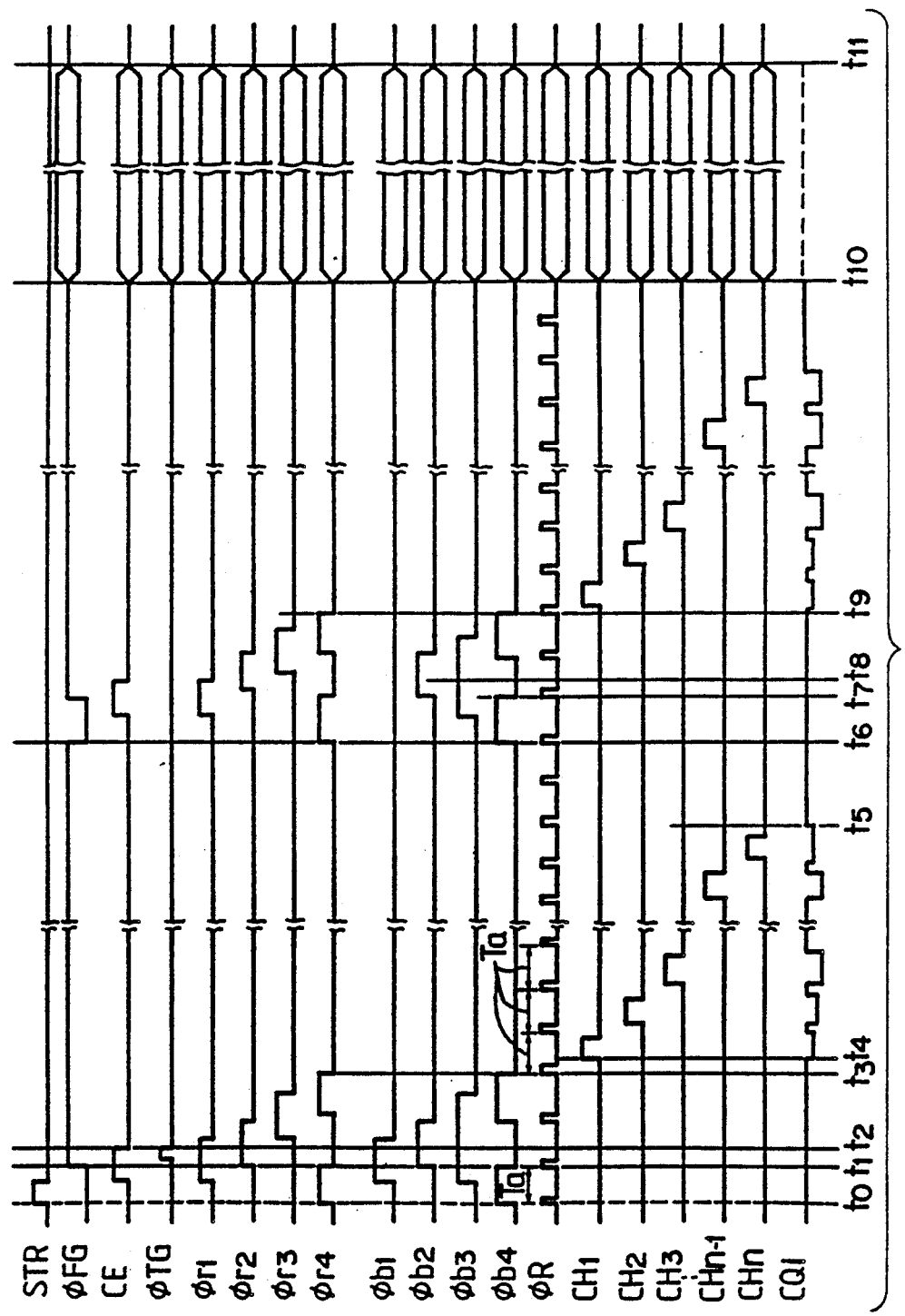
FIG. 6 is a timing chart of assistance in explaining a function of the image sensor depicted in FIG. 2.
Figure 7:
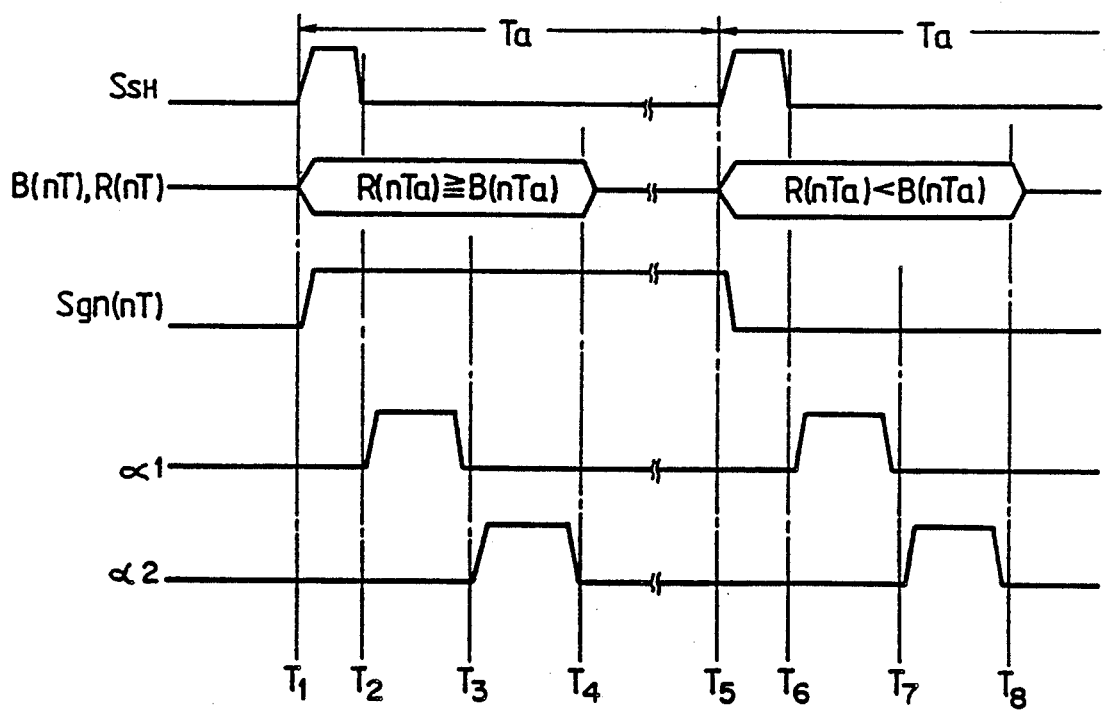
FIG. 7 is a timing chart of assistance in explaining a function of the analog correlation arithmetic unit of FIG. 5.
Figure 7:
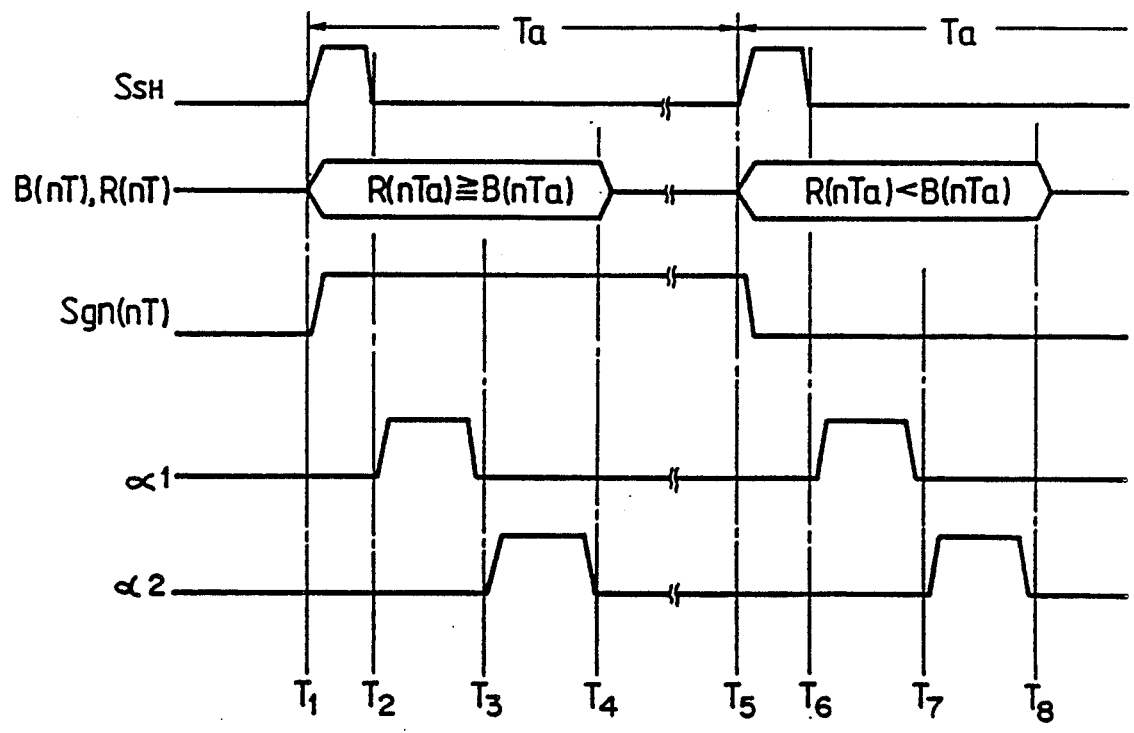

The function of the thus arranged phase-difference detector will be discussed with reference to the timing charts of FIGS. 6 and 7. A control signal generating unit 37 generates a variety of control signals. The arithmetic operation begins upon synchronization with a start signal STR (generated interlocking with a release button of a camera) applied at a timing t0. Firstly, capacitor element 41 of analog correlation arithmetic unit 15 is set, and secondly reset signals $\Phi_R$ are applied at predetermined intervals Ta to reset terminals 28 and 29 of the image sensor.

During a t0–t3 period, 4-phase clock signals $\Phi$r1 to $\Phi$r4 and $\Phi$b1 to $\Phi$b4 are generated for causing the charge transfer elements (see FIG. 2) of shift register units 24 and 25 to transfer the electric charges pitch by pitch on the basis of a 4-phase driving method.

At timing t1 during the transfer of electric charges by the electric charges transfer elements, control signal CE comes to assume "H" level, and MOSFETs Mr1 to Mrm and Mb1 to Mbn are turned ON. In the meantime, reset signal $\Phi_{FG}$ is inverted from "L" level to "H" level, with the result that floating gates Fr1 to Fr40 and Fb1 to Fb32 are clamped at an electric potential of power supply voltage $V_{DD}$. At timing t2, control signal CE assumes "L" level, whereby MOSFETs Mr1, Mr2 . . . Mb1, Mb2, . . . are turned OFF. As a result, the floating gates are held at that electric potential. Thus, a potential-well as depicted in FIG. 4 is formed in the semiconductor substrate under the floating gates. Slightly before timing t2, transfer gates 28 and 29 are made conductive by gate signals TG, so that the signal charges of accumulation units 22 and 23 are transferred to the charge transfer elements corresponding to shift register units 24 and 25. The electric charges are further transferred to the respective potential-wells until the transfer of the electric charge transfer elements is completed at a timing t4.

Next, during a t4–t5 period, channel change over signals CH$_1$ to CH$_{32}$ are outputted, thereby turning ON MOSFETs Qr1 to Qrm and Qb1 to Qbn which are combined to constitute a multiplexer circuit. The time-series signals for every pixel are outputted to contacts Pr0 and Pb0. Signal waveforms of contacts Pr0 and Pb0 appear as shown in CQi of FIG. 6. A voltage-drop corresponding to the signal charge for every pixel is caused in each of floating gates Fr1 to Frm and Fb1 to Fbn, and at contacts Pr0 and Pb0 there appear voltage waveforms proportional to $V_{DD}$ based upon the voltage-drop.

During a t4–t5 period, time-series signals R(t) and B(t), which are present at contacts Pr0 and Pb0, are supplied to analog correlation arithmetic unit 15 depicted in FIG. 5. During the t4–t5 period, analog signals R(t) and B(t) are input to analog correlation arithmetic unit 15 every time channel change-over signals CH$_1$ to CH$_{32}$ are applied to MOSFETs Qr1–Qrm and Qb1–Qbn at intervals Ta. At intervals Ta, the integrated values of difference signals ΔE(nTa) are sequentially accumulated in capacitor element 41 at the timings shown in FIG. 7.

Control circuit 37 outputs, to sample hold circuits 32 and 33, sample hold signals $S_{SH}$ each assuming "H" level at predetermined intervals T$_1$ to T$_2$, and analog signals B(nT) and R(nT) are thereby held. If the analog signals have a relation expressed as: R(nT) B(nT), polarity signal Sgn(nT) becomes "H" level. Then, control circuit 37 outputs control signals Sch(NT) for changing over both switching elements 34a and 34d to the "ON" state and switching elements 34b and 34c to the "OFF" state. As a result, the non inversion input terminal of differential amplifier 35 receives arithmetic signals R(nT), while the inversion input terminal thereof receives arithmetic signal B(nT), and integrator 38 is supplied with a difference ΔE(nT) between these signals. In this state, control signals $\alpha_1$ and $\alpha_2$ are outputted at timing T$_2$ at which the sampling process has been finished. During a T$_2$–T$_3$ period, control signal $\alpha_1$ assumes "H" level, whereas control signal $\alpha_2$ assumes "L" level. Consequently, only switching elements 42 and 45 are turned "ON", whereby difference signals ΔE(nT) are accumulated in capacitor element 40. Subsequent to this step, during a $T_3-T_4$ period, control signal $\alpha_1$ is at "L" level, while control signal $\alpha_2$ is at "H" level, with the result that only switching elements 43 and 44 are turned "ON". In consequence of this, capacitor elements 40 and 41 are coupled to each other, whereby the electric charges corresponding to difference signals $\Delta E(nT)$ accumulated in capacitor element 40 are transferred to capacitor element 41 and accumulated therein.

On the other hand, as shown during a T5–T8 period in the Figure, if the relation between analog signals B(nT) and R(nT) is defined such as: R(nT)<B(nT), polarity signal Sgn(nT) assumes "L" level. Then, control circuit 37 outputs control signals Sch(nT) for changing over switching elements 34a and 34d to the "OFF" state and also switching elements 34b and 34c to the "ON" state. Hence, analog signals B(nT) are supplied to the noninversion input terminal of differential amplifier 35, signals R(nT) are supplied to the inversion input terminal thereof, and difference $\Delta E(nT)$ there between is supplied to integrator 38. As discussed above, the charges corresponding to R(nT)–B(nT) are accumulated in capacitor element 41 of integrator 38.

The integrating operations for a predetermined number of pixels are performed at every interval Ta, thereby computing a first analog correlative value H(1) of an image pattern of the subject, which is formed in each pixel of basic image sensor 18 as well as of reference image sensor 19. Subsequently, during a predetermined period starting from a timing t5, A/D converter 16 outputs correlative value H(1) defined as digital data.

Next, just before a timing t6 the charges stored in capacitor element 41 are discharged. Thereafter, during a t6–t9 period, shift register unit 24 of reference image sensor 18 transfers all the signal charges pitch by pitch in the horizontal direction, whereas shift register unit 25 of basic image sensor transfers no electric charge. A second correlative value H(2) is outputted from A/D converter 16 by effecting the same process as above at timings t0 to t6.

As described above, the correlative values are sequentially obtained while relatively shifting pitch by pitch the phases of the signal charges of shift register unit 24 of reference image sensor 18 with respect to the signal charges of shift register unit 25 of basic image sensor 19. Correlative value patterns H(1), H(2), . . . H(L) containing information on the phase-difference are thus sought, thereby obtaining the results from the foregoing formula (1).

As discussed above, in this embodiment, the correlation arithmetic process is done by directly using the analog signals, and hence it is possible to ameliorate the arithmetic accuracy and increase the processing speed. The arithmetic results after the computation has been carried out are converted into digital data by means of the A/D converter, thus making it possible to process digital signals. As is clarified in this embodiment, there can be provided more advantages in terms of the processing speed and processing accuracy than every before by converting the correlative values into digital data after the analog correlation arithmetic operation has been done. Besides, the high-speed and expensive A/D converter is eliminated. Hence, the components of the phase-difference detector can be formed on one chip.

Figure 13:
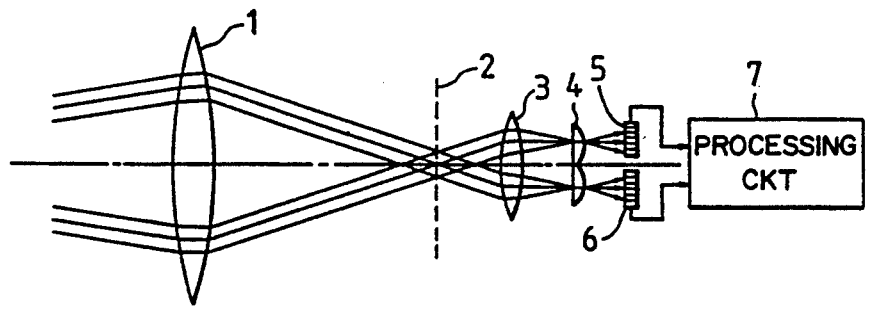
FIG. 13 is a schematic block diagram illustrating an optical system incorporating a conventional phase-difference detector.
Figure 14:
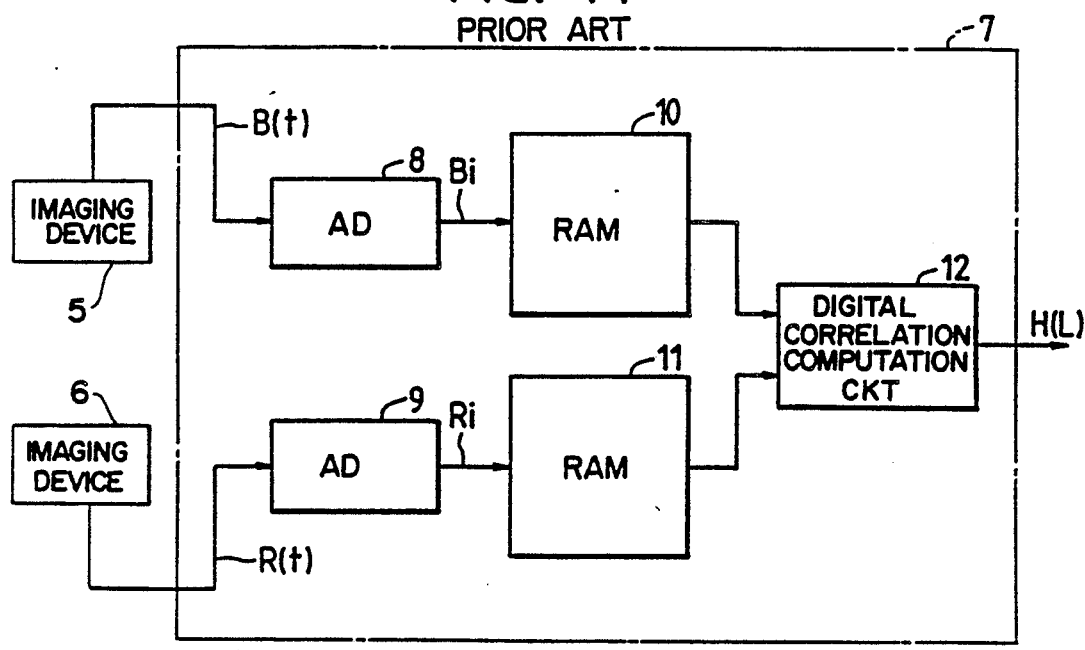
FIG. 14 is a block diagram schematically illustrating a constitution of the conventional phase-difference detector.

Another embodiment of the image sensor will be explained in conjunction with FIG. 8. The image sensor includes first and second light receiving units 50 and 51 consisting of groups of photoelectric converting elements Dbl to Dbn and Drl to Drm for photoelectrically converting a pair of images of the subject, which are formed by means of a separator lens (see FIG. 13) disposed in an optical system of the camera. Light receiving units 50 and 51 are aligned at spacings $L_1$ and $L_2$ in the direction orthogonal to the optical axis. W is a pitch width of each photoelectric converting element Dbl to Dbn and Drl to Drm, the arrangement being such that for the purpose of shifting N-pixels the spacing $L_2$ is given by: $L_2 = L_1 + N \times W$, where an N-pitch width ($N \times W$) is added to spacing $L_1$. N-pixels are added to the right and left ends of the row of pixels. Disposed in parallel with light receiving units 50 and 51 are accumulation units 52 and 53, transfer gates 54 and 55 and shift register units 56 and 57.

Accumulation units 52 and 53 are composed of CCDs (Charge Coupled Device) including charge transfer elements Tbl to Tbn and Trl to Trm corresponding to photoelectric converting elements Dbl to Dbn and Drl to Drm. A shift register unit 56 is composed of n-groups of CCDs for transferring the signal charges in the vertical direction indicated by arrows of the Figure for every charge transfer element Tbl to Tbn. A shift register unit 57 consists of n-groups of CCDs for transferring the signal charges in the vertical direction indicated by arrows of the Figure for every charge transfer element Trl to Trm. In other words, the groups of n-CCDs are sectioned from each other and do not act to transfer charges in the horizontal direction. For instance, the signal charge generated in electric charge transfer element Tbl is transferred via a transfer gate TG to a CCD consisting of elements Cbl1 to Cbl4, and is transferred in the vertical direction only within this CCD. In the case of transferring the signal charges by use of the CCDs, the process is the same with the other charge transfer elements Tb2, Tb3, . . . , Tbn. The arrangement is also the same with respect to charge transfer elements Trl to Trm. That is to say, n-groups of CCDs each consisting of 4 elements are formed, wherein the signal charges are transferred only in the vertical directions indicated by the arrows. It should be noted that the transferring operations of respective CCDs are effected at the same intervals in synchronism with driving signals $\Phi_1$, $\Phi_2$, $\Phi_3$ and $\Phi_4$ on the basis of the 4-phase driving method.

Formed contiguously to charge transfer elements Cbl4 to Cbn4 and Crl4 to Crm4 positioned at terminals of the respective CCDs are floating gates Fbl to Fbn and Frl to Frlm which are in turn connected to a reset terminals RES through MOSFETs Mbl to Mbn and Mrl to Mrm. Control signals CE are transmitted to the gates of these MOSFETs. Simultaneously, channel change-over signals Kbl to Kbn and Krl to Krm outputted from counters 60 and 61 are applied to the gate terminals thereof, whereby MOSFETs Qbl to Qbn and Qrl to Qrm perform a multiplex operation. Floating gates Fbl to Fbn and Frl to Frm are further connected to common contacts Pb and Pr via the above-mentioned MOSFETs. Common contacts Pb and Pr are connected through impedance converting circuits 58 and 59 to output terminals Pb0 and Pr0.

Impedance converting circuits 58 and 59 each have the same circuitry, the circuits including: MOSFETs, Ib1, Ib2, Ir1 and Ir2 whose drain-source paths are connected in series between power supply $V_{DD}$ and ground; and MOSFETs Ib3 and Ir3, connected in parallel between the gates and sources of MOSFETs Ib1 and Ir1, for clamping common contacts Pb and Pr to power supply $V_{DD}$ when applying refresh signals $\Phi_R$ thereto.

The gates of MOSFETs Ib2 and Ir2 are biased at a predetermined potential.

Analog signals B(t) and R(t) generated at output terminals Pb0 and Pr0 undergo a differential arithmetic process by an analog correlation arithmetic circuit 62, thereby obtaining analog correlative values Ho(L) in accordance with the formula (1).

Figure 9:
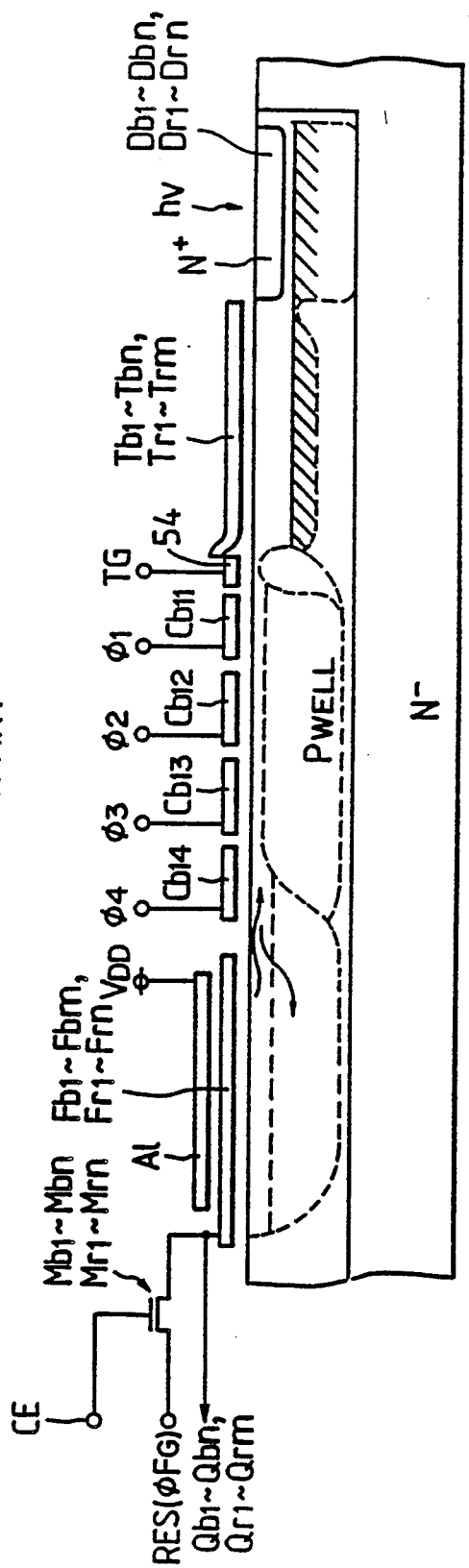
FIG. 9 is a view showing a configuration in vertical section of the image sensor depicted in FIG. 8.

The phase-difference detector in this embodiment can be arranged in the form of an IC as a semiconductor integrated circuit device. A configuration in the vicinity of floating gates Fb1 to Fbn and Fr1 to Frm will be explained with reference to a schematic sectional view of FIG. 9. FIG. 9 is a sectional view taken in the direction of the arrows substantially along the line Y—Y of FIG. 8, FIG. 9 being representative of other configurations in the vicinity of the remaining floating gates because of the similarity thereof.

Referring to FIG. 9, part of a plurality of N+ type layers are formed on a P-type diffused layer (P-Well) formed on the surface of an N-type semiconductor substrate, thus constituting groups of photoelectric converting elements Db1 to Dbn and Dr1 to Drm of light receiving unit 50 (51). Disposed in parallel through an $SiO_2$ layer (not illustrated) on the semiconductor substrate are transfer gate electrode layers Tb1 to Tbn and Tr1 to Trm constituting charge transfer elements of accumulation unit 52 (53), gate electrode layers constituting transfer gate 54 (55), and transfer gate electrode layers constituting the charge transfer elements of shift register unit 56 (57). Adjacent to shift register units 56 and 57 are laminated a polysilicon layer constituting floating gates Fb1 to Fbn and Fr1 to Frm and an electrode layer Al which is clamped to power supply $V_{DD}$. Electrode layer Al is formed to cover entirely the upper surface of a plurality of floating gates Fb1 to Fbn and Fr1 to Frm. One end of each of the floating gates is connected to MOSFETs Mb1 to Mbn and Mr1 to Mrm.

Reset signal $\Phi_{FG}$ applied to reset terminal RES is set at an electric potential equal to that of power supply $V_{DD}$. Simultaneously, floating gates Fb1 to Fbn and Fr1 to Frm are clamped to power supply $V_{DD}$ through MOSFETs Mb1 to Mbn and Mr1 to Mrm by use of control signals CE each assuming "H" level, and thereafter MOSFETs Mr1 to Mbn and Mr1 to Mrm are again brought into a shut-off state. Thus, a deep potential-well is formed, as indicated by a dotted line of FIG. 9, in the semiconductor substrate; and the signal charges of shift register unit 56 (57) flow into a region provided underneath floating gates Fb1 to Fbn and Fr1 to Frn. Voltage-variations corresponding to an amount of signal charges which have flowed thereinto are caused in floating gates Fb1 to Fbn (Fr1 to Frn), and it is possible to detect a pattern, as a voltage signal, of the image formed on light receiving unit 50 (51).

On the other hand, reset terminal RES is set at ground potential, and at the same moment MOSFETs Mb1 to Mbn and Mr1 to Mrn are turned ON, thus setting floating gates Fb1 to Fbn and Fr1 to Frn at "L" level. The potential-well in the region under the floating gates then becomes shallower, and the signal charges are allowed to revert to shift register unit 57 (57) once again. Such signal charges re non-destructively transferred, and hence the readout of the signal charges can be repeated many times.

The signals generated through floating gates Fb1 to Fbn and Fr1 to Frn are converted into time-series signals B(t) and R(t) by the multiplex operations of MOSFETs Qb1 to Qbn and Qr1 to Qrn, and are then outputted to respective output terminals Pb0 and Pr0.

Figure 10:
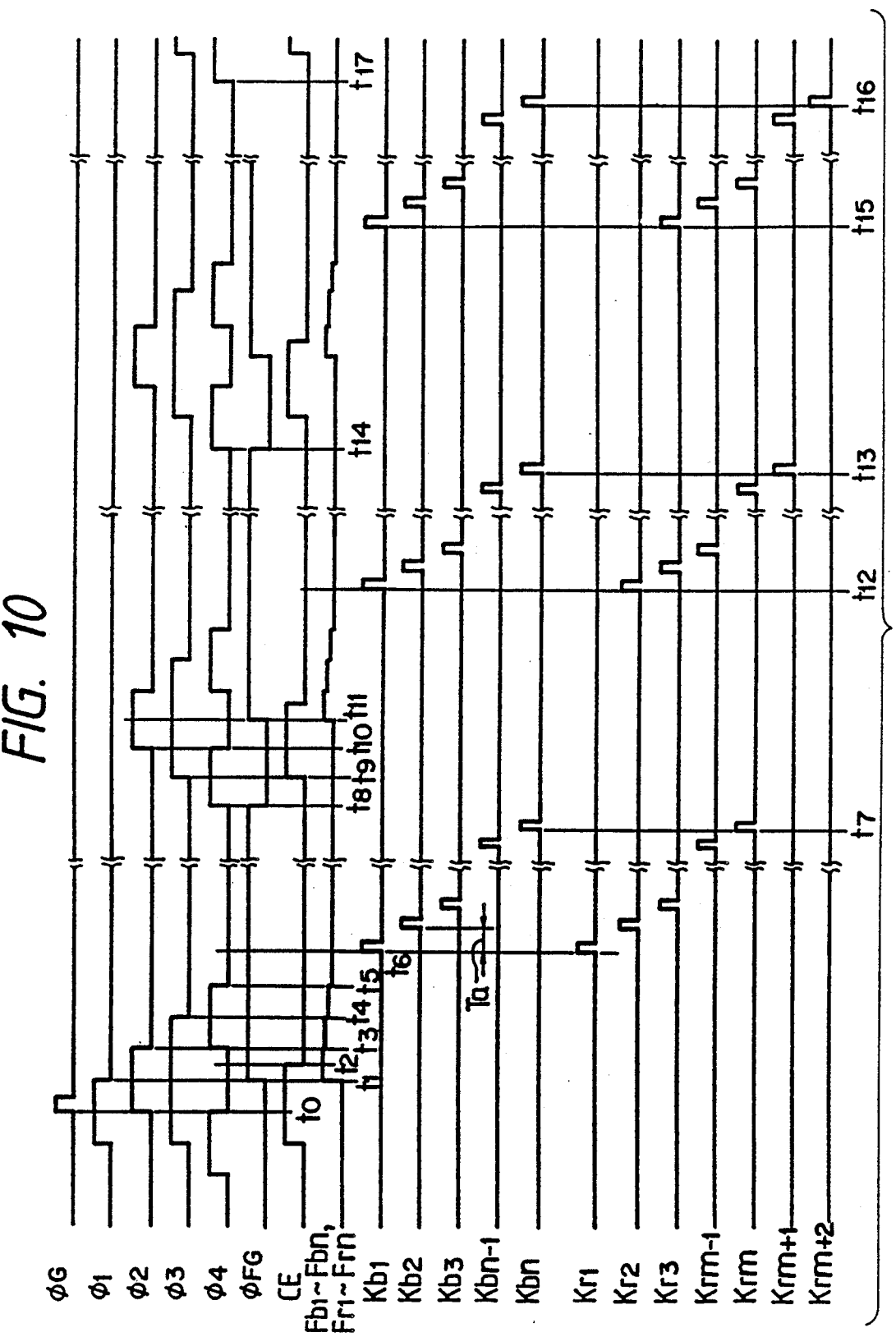
FIG. 10 is a timing chart of assistance in explaining a function of the image sensor of FIG. 8.

The description will next be focused on the function of the thus constructed image sensor in conjunction with a timing chart of FIG. 10.

Supporting that the patterns of images of the subject are photoelectrically converted by light receiving units 50 and 51 as well as by accumulation units 52 and 53 before timing t0, and if a signal $\Phi_G$ assumes "H" level at timing t0 to make transfer gates 54 and 55 conductive for a predetermined period, the signal charges of respective elements Tb1 to Tbn and Tr1 to Trn are transferred to predetermined potential-wells formed in transfer elements Cb11 to Cbn1, Cb12 to Cbn2, Cb13 to Cbn3, Cr11 to Crn1, Cr12 to Crn2 and Cr13 to Crn3 of the first, second and third rows of shift register units 56 and 57 by driving signals $\Phi_1$, $\Phi_2$ and $\Phi_3$ each assuming "H" level during a t0–t1 period.

During a t1–t2 period, signal $\Phi_{FG}$ and control signal CE assume "H" level at the same time, whereby floating gates Fb1 to Fbn and Fr1 to Frn are clamped to power supply voltage $V_{DD}$. The individual floating gates are thus reset. Simultaneously, during a t1–t3 period, signals $\Phi_1$ and $\Phi_4$ assume "L" level, while signals $\Phi_2$ and $\Phi_3$ assume "H" level, so that the signal electric charges are held in transfer elements Cb12 to Cbn2, Cb13 to Cbn3, Cr12 to Crn2 and Cr13 to Crn3 of the second and third rows of shift register units 56 and 57.

During a t3–t4 period, signals $\Phi_1$ and $\Phi_2$ assume "L" level, while signals $\Phi_3$ and $\Phi_4$ assume "H" level, whereby the signal electric charges are transferred to transfer elements Cb13 to Cbn3, Cb14 to Cbn4, Cr13 to Crn3 and Cr14 to Crn4 of the third and fourth rows of shift register units 56 and 57. Voltage signals corresponding to the signal electric charges are gradually generated in floating gates Fb1 to Fbn and Fr1 to Frn.

During a t4–t5 period, signals $\Phi_1$, $\Phi_2$ and $\Phi_3$ become "L" level, while a signal $\Phi_4$ assumes "H" level. After a timing t5 has passed, the level of signal $\Phi_4$ also becomes "L", so that the signal charges generated in respective elements Tb1 to Tbn and Tr1 to Trn are held in the potential-wells formed undeneath the predetermined floating gates. Voltages corresponding to the image patterns of the subject are produced in individual floating gates Fb1 to Fbn and Fr1 to Frn.

During a t6–t7 period, the voltages generated in floating gates Fb1 to Fbn and Fr1 to Frn are outputted to contacts Pb and Pr through MOSFETs Qb1 to Qbm and Qr1 to Qrm which sequentially become conductive and non-conductive in syncrhonism with rectangularly-shaped change-over signals Kb1 to Kbm and Kr1 to Krm outputted at predetermined intervals Ta from counters 60 and 61. The voltages are further supplied in the form of time-series signals B(t) and R(t) via impedance converting circuits 58 and 59 to analog arithmetic circuit 62. More specifically, counter 60 inputs to analog arithmetic circuit 62 m (herein, m<n) voltage signals among n voltage signals generated in floating gates Fb1 to Fbn. Similarly, counter 61 inputs to analog arithmetic means 62 m (m<n) voltage signals among n voltage signals of floating gates Fr1 to Frn. Analog arithmetic circuit 62 performs a differential arithmetic operation in accordance with time-series signals B(t) and R(t), and outputs the first correlative value H(1). Note that the constitution shown in the embodiment of FIG. 5 may be applied to analog arithmetic means 62.

During a t8-t9 period, signal $\Phi_4$ becomes "H" level. During a t9-t10 period, signals $\Phi_3$ and $\Phi_4$ assume "H" level. Simultaneously, signal $\Phi_{FG}$ assumes "L" level, while signal CE becomes "H" level. As a result, the electric potentials of floating gates Fb2 to Fbn and Fr1 to Frn decrease, whereby the potential-wells are formed in transfer elements Cbl3 to Cbn3, Cbl4 to Cbn4, Crl3 to Crn3 and Crl4 to Crn4 of the third and fourth rows of shift register units 56 and 57. Hence, the signal electric charges existing under the floating gates revert to the predetermined potential-wells formed beneath the transfer elements of the third and fourth rows.

During a t10-t14 period, signals $\Phi_2$ and $\Phi_3$ become "H" level, while signal $\Phi_4$ assumes "L" level, whereby the signal charges are returned to and held in the individual potential-wells of transfer elements Cbl2 to Cbn2, Cbl3 to Cbn3, Crl2 to Crn2 and Crl3 to Crn3 of the second and third rows of shift register units 56 and 57.

During a t11-t12 period, the same controlling operations as those performed during the t1-t6 period are carried out. The voltage signals associated with the same signal charges are generated in respective floating gates Fb1 to Fbn and Fr1 to Frn until reaching timing t12. At this time, signals $\Phi_G$ and $\Phi_1$ remain at "L" level, and hence the signal charges, which have once been transferred, undergo no influence from light receiving units 50 and 51 as well as from accumulation units 52 and 53. Until a series of correlative values are completely computed, these signals $\Phi_G$ and $\Phi_1$ remain at "L" level.

During a t12-t13 period, counter 60 outputs pulse signals Kbl to Kbm with the same timing as the previous t6-t7 period. On the other hand, counter 61 outputs change-over signals Kr2 to Krm+1 for the purpose of outputting m voltage signals of floating gates Fr2 to Frm+1, though the generation timing synchronizes with change-over signals Kbl to Kbm. Therefore, time-series signals B(1), ... B(2), B(m) are generated at output terminals Pb0. Time-series signals R(2), R(3), ... R(t), R(t+1), whose phases are relatively shifted by [1], are generated from output terminal Pr0. Based on time-series signals B(t) and R(t+1) sequentially outputted, analog arithmetic circuit 62 functions to generate the next correlative value H(2).

During a t14-t16 period, the same controlling operations as those performed during the previous t8-t13 period are repeated. However, during the t15-t16 period for which the voltage signals are again produced in respective floating gates Fb1 to Fbn and Fr1 to Frn, counter 61 sequentially outputs change-over signals Kr3 to Krm+2, while counter 60 outputs, as is done during the previous period, change-over signals Kbl to Kbm. Hence, time-series signals B(1), B(2), ..., B(t) are generated at output terminal Pb0. Generated at output terminals Pr0 are time-series signals R(3), R(4), ..., R(t+2) the phases of which are shifted by [1]. Based on these time-series signals, analog arithmetic means 62 creates a correlative value H(3). At and after a subsequent timing t17, there the same processes are carried out as those performed during the t14-t16 period. Analog arithmetic circuit 62 produces correlative values shown in the foregoing formula (1) by outputting the change-over signals from counter 61 while sequentially shifting the phases thereof with respect to the change-over signals from counter 60.

As discussed above, in this embodiment a pair of image patterns of the subject undergo photoelectric conversion, thereby obtaining the signal charges. The signal charges are read out as voltage signals in a nondestructive manner through the floating gates. The thus read signals are converted at predetermined timings into time-series signals B(t) and R(t+L) (L indicates the relative shift in phase) whose phases are shifted in a relative manner, and are then outputted. It is therefore possible to detect the phase-difference at a high speed with high accuracy by effecting the analog arithmetic process in accordance with time-series signals B(t) and R(t+L). Furthermore, there can be acquired well-matched conditions of the operations and of configurations for generating time-series signals B(t) and R(t+L). Particularly, the matching properties of the operations and of the configurations of shift register units 56 and 57 are favourable, so that the arithmetic accuracy can be improved. Additional features, which are not seen in the prior art, are such that the controlling process can be simplified, and at the same time the device is manufactured by effectively utilizing the relative accuracy obtainable by using integrated circuit technology.

Figure 11:
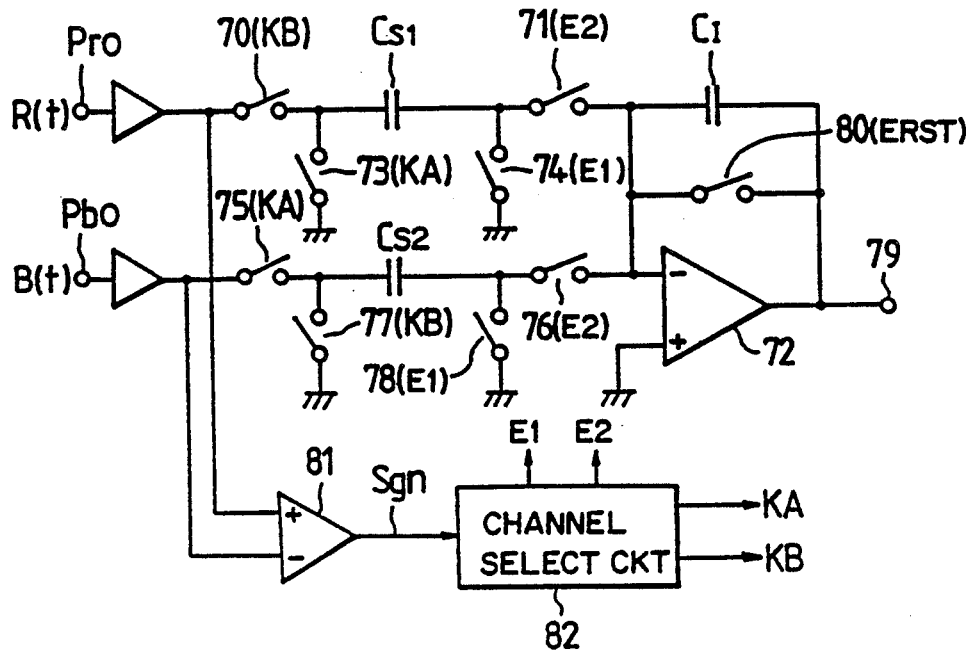
FIG. 11 is a circuit diagram illustrating a constitution of another embodiment of the analog correlation arithmetic unit.

Another embodiment of the analog correlation arithmetic unit will be described with reference to FIGS. 11 and 12. This type of analog correlation arithmetic unit is supplied with analog signals R(t) and B(t) outputted in time-series from the image sensor depicted in FIG. 2 or 8, the arrangement being such that terminal Pr0 is connected to the inversion input terminal of a differential integrator 72 through a switching element 70, a capacitor element Cs1 and a switching element 71 which are connected in series to each other, both ends of capacitor element Cs1 being connected via switching elements 73 and 74 to a ground terminal. On the other hand, a signal line extending from terminal Pb0 is connected to the inversion input terminal of differential integrator 72 through a switching element 75, a capacitor element Cs2 and a switching element 76 which are connected in series to each other. Both ends of capacitor element Cs2 are connected via switching elements 77 and 78 to the ground terminal. Connected between the inversion input terminal of differential integrator 72 and an output terminal 79 are a switching element 80 and a capacitor element $C_I$ which are connected to each other in parallel.

Signal lines extending respectively from output terminals Pr0 and Pb0 are further connected to the noninversion input terminal and inversion input terminal respectively of an analog comparator 81; the output terminal thereof is connected to the input terminal of a channel select circuit 82. Channel select circuit 82 is adapted to generate select signals $\epsilon_1$, $\epsilon_2$, KA and KB for controlling "ON" and "OFF" of switching elements 70, 71 and 73 through 78.

Analog comparator 81 outputs a polarity signal Sgn assuming "H" level when the levels of analog signals are expressed such as: $R(t) \geq B(t)$ but "L" level when $R(t) < B(t)$. The voltage levels of select signals $\epsilon_1$, $\epsilon_2$, KA and KB are determined pursuant to the level of polarity signal Sgn.

The function of the thus constructed arithmetic means will be described with reference to a timing chart of FIG. 12.

Switching element 80 is at first turned "ON" by a reset signal $\epsilon_{RST}$ transmitted from reset means not shown, and unnecessary electric charges in capacitor element $C_I$ are discharged. After this step, switching element 80 is again turned "OFF". The operation shown in FIG. 12 then begins.

Figure 12:
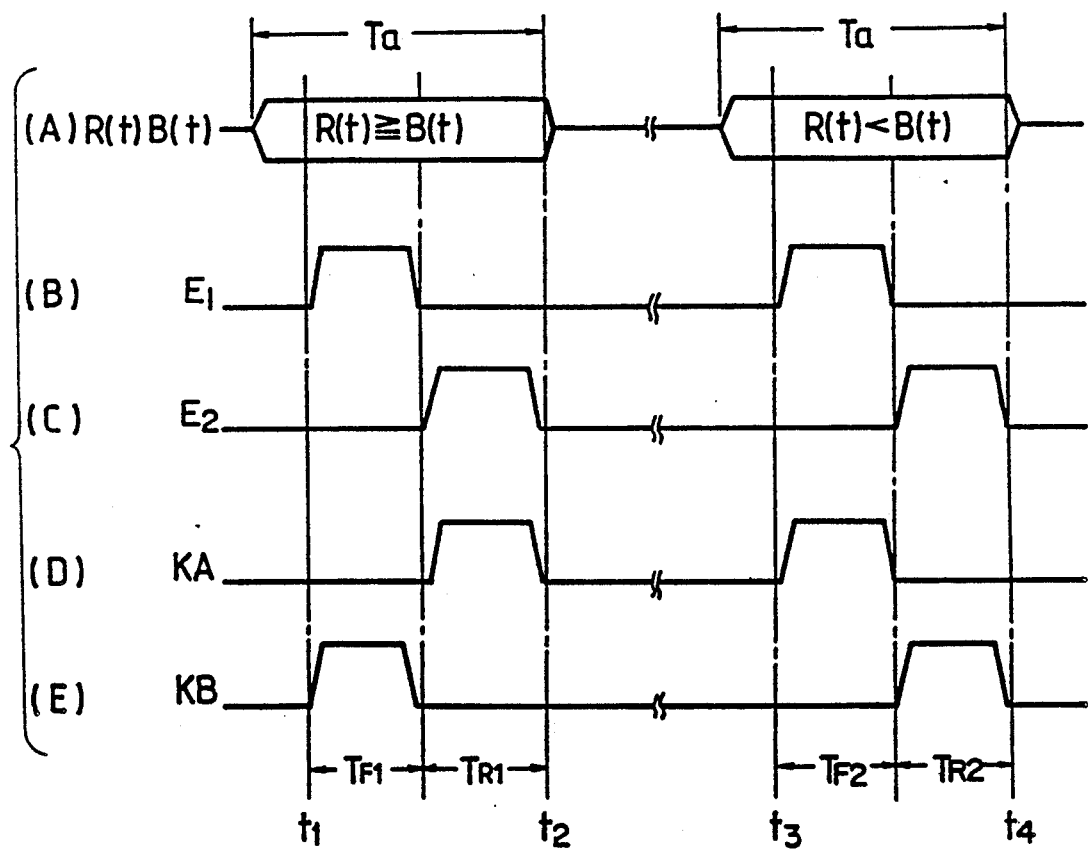
FIG. 12 is a timing chart of assistance in explaining a function of the analog correlation arithmetic unit depicted in FIG. 11.

As illustrated in FIG. 12, analog signals R(t) and B(t) are outputted at predetermined intervals Ta from the image sensor. As is shown during a t1–t2 period, if the analog signals have a relation: R(t)≧B(t), polarity signal Sgn assumes "H" level, with the result that pulse select signals $\epsilon_1$, $\epsilon_2$, KA and KB illustrated in (B), (C), (D) and (D) of FIG. 12 are generated. Select signals $\epsilon_1$ and $\epsilon_2$ and select signals KA and KB are generated such that they do not assume "H" level simultaneously. On the other hand, as is shown during a t3–t4 period, if the relation between the arithmetic signals is expressed as: R(t)<B(t), polarity signal Sgn becomes "L" level, thereby generating select signals $\epsilon_1$ and $\epsilon_2$, KA and KB each having the opposite phase to that shown during the t1–t2 period. If is to be noted that select signals KA and KB are produced at the same timing irrespective of the levels of select signals $\epsilon_1$ and $\epsilon_2$ and also polarity signal Sgn.

At a first half interval $T_{F1}$ of the t1–t2 period, switching elements 74, 78, 70 and 77 are turned "ON" by select signals $\epsilon_1$, $\epsilon_2$, KA and KB. Subsequently, analog signals R(t) are charged in capacitor element Cs1, whereas the unnecessary electric charges in capacitor element Cs2 are discharged. At a second half interval $T_{R1}$ of the t1–t2 period, switching elements 73 and 71 are turned "ON", so that the electric charges of capacitor element Cs1 are coupled with those of capacitor element $C_I$, and at the same moment switching elements 77 and 78 are turned "OFF". Then, analog signals B(t) are inputted via capacitor element Cs2 to differential integrator 72. As a result, electric charges given by the following formula (4) are accumulated in capacitor element $C_I$.

$$q(t) = \frac{C_I}{C_{S1}} \cdot R(t) - \frac{C_I}{C_{S2}} \cdot B(t) \quad (4)$$

As is shown during a t3–t4 period, if the relation between the analog signals is defined by: R(t)<B(t), at a first half interval $T_{F2}$ of the t3–t4 period switching elements 74 and 78, 73 and 75 come into the "ON" state. Analog signals B(t) are then charged in capacitor element Cs2, whereas the unnecessary electric charges of capacitor element Cs1 are discharged. At a second half interval $T_{R2}$ of the t3–t4 period, switching elements 77 and 76 are brought into the "OFF" state, and hence the electric charges of capacitor element Cs2 are coupled with those of capacitor element $C_I$. Concurrently, switching elements 70 and 71 are turned "ON", while switching elements 73 and 74 are turned "OFF", thereby inputting analog signals R(t) via capacitor element Cs1 to differential integrator 72. As a result, electric charges q(t) expressed by the following formula (65) are accumulated in capacitor element $C_I$.

$$q(t) = \frac{C_I}{C_{S2}} \cdot B(t) - \frac{C_I}{C_{S1}} \cdot R(t) \quad (5)$$

As is obvious from the formulae (4) and (5), this arithmetic circuit invariably accumulates, in capacitor element $C_I$, the electric charge equivalent to a value obtained by subtracting the analog signal of a smaller level from the analog signal of a larger level. Therefore, when repeatedly processing time-series analog signals R(1), ... R(n), B(1), ... B(n), as is expressed by the following formula (6), an absolute value of the difference between these signals is given as a voltage.

$$H = \sum_{t=1}^{n} \left| \frac{C_I}{C_{S2}} \cdot B(t) - \frac{C_I}{C_{S1}} \cdot R(t) \right| \quad (6)$$

In the second place, the reference unit of the image sensor transfers the electric charges pitch by pitch, and signal charges which are out of phase with each other are consecutively outputted in time series. Then, an arithmetic operation is carried out in conformity with the following formula (7). The shifting phase corresponds to the foregoing relative movement quantity L, and correlative values at the time of sequentially varying the movement quantity L are given by the formula (7), these correlative values being detected as voltages from output terminal 79.

$$H(L) = \sum_{t=1}^{n} \left| \frac{C_I}{C_{S2}} \cdot B(t) - \frac{C_I}{C_{S1}} \cdot R(t + L - 1) \right| \quad (7)$$

Namely, the formula (7) implies that correlative values H(1), H(2), ... H(L) are obtained by processing the analog signals.

It is possible to detect the phase-difference from distribution patterns of these correlative values.

As discussed above, the present invention provides the following effects. The phase-difference detector for distinguishing the focusing condition by detecting relative positions of the pair of optical images of the subject comprise: the sensor means for sequentially outputting analog electric signals corresponding to one of the optical images formed by photoelectrically converting the pair of optical images and analog electric signals corresponding to the other optical image in a non-destructive manner at predetermined intervals while shifting the phases with respect to each other; the analog correlation arithmetic means for effecting the analog correlation arithmetic process of the correlative values associated with the pair of analog electric signals outputted from the sensor means; and the A/D converter for converting the correlative values outputted from the analog correlation arithmetic means into digital signals. In this constitution, the correlation arithmetic operation is done by directly using the analog signals generated by the photoelectric conversion, and the correlative values obtained by this computation are converted into digital signals. Hence, the arithmetic process can be performed at a high speed. Since there is substantially no rounding error incidental to the digital correlation arithmetic process which is to be effected after the conversion into digital signals, highly accurate arithmetic results can be obtained.

What is claimed is:

1. A phase-difference detector for discriminating a focusing state of an objective lens by detecting relative positions of a pair of optical images from an optical axis comprising:

sensor means for sensing the pair of optical images and sequentially outputting a first analog signal corresponding to one of the pair of optical images and a second analog signal corresponding to another of the pair of optical images at predetermined intervals in a non-destructive manner and for shifting phases of said first and second analog signals with respect to each other, said first and second analog signals being generated by photoelectric conversion of said pair of optical images;

analog correlation arithmetic means, operatively connected to said sensor means, for performing an analog correlation arithmetic operation to obtain analog correlative values from said first and second analog signals outputted from said sensor means; and an A/D converter, operatively connected to said analog correlation arithmetic means, for converting said analog correlative values outputted from said analog correlation arithmetic means into digital correlative values;

said sensor means including,
- a first light receiving unit essentially consisting of a group of photoelectric conversion elements arrayed to optically receive one of the pair of optical images and outputting first charge signals corresponding to charges induced in said first light receiving unit,
- a first signal readout unit, operatively connected to said first light receiving unit, for transferring said first charge signals in a predetermined array-direction and for outputting said first analog signals corresponding to said first charge signals in parallel through floating gates,
- a second light receiving unit essentially consisting of a group of photoelectric conversion elements arrayed to optically receive another of the pair of optical images and outputting second charge signals corresponding to charges induced in said second light receiving unit,
- a second signal readout unit, operatively connected to said second light receiving unit, for transferring said second charge signals in a predetermined array-direction and for outputting said second analog signals corresponding to said second charge signals in parallel through floating gates, and
- control means, operatively connected to said first and second signal readout units, for outputting at predetermined intervals both said first and second analog signals out of phase with each other.

2. A phase-difference detector for discriminating a focusing state of an objective lens by detecting relative positions of a pair of optical images from an optical axis comprising:

sensor means for sensing the pair of optical images and sequentially outputting a first analog signal corresponding to one of the pair of optical images and a second analog signal corresponding to another of the pair of optical images at predetermined intervals in a non-destructive manner and for shifting phases of said first and second analog signals with respect to each other, said first and second analog signals being generated by photoelectric conversion of said pair of optical images;

analog correlation arithmetic means, operatively connected to said sensor means, for performing an analog correlation arithmetic operation to obtain analog correlative values from said first and second analog signals outputted from said sensor means; and an A/D converter, operatively connected to said analog correlation arithmetic means, for converting said analog correlative values outputted from said analog correlation arithmetic means into digital correlative values;

said analog correlation arithmetic means including,
a switched capacitor integrator including,
a plurality of capacitor elements, and
a group of switching elements for connecting and disconnecting said capacitor element;

said switched capacitor integrator being supplied with said first and second analog signals;

said group of switching elements being controlled so as to turn ON and OFF according to a difference in magnitude between said first and second analog signals by detecting said difference in magnitude therebetween;

said analog correlative values of said first and second analog signals being computed by generating, in said switched capacitor integrator, an electric charge corresponding to an integrated value of an absolute value of said difference in magnitude between said first and second analog signals every time said first and second analog signals are out of phase.

* * * * *